United States Patent [19]

Günther

[11] 4,401,051
[45] Aug. 30, 1983

[54] PROCESS AND AN APPARATUS FOR EXTRACTING FINE DROPLETS OF PAINT FROM PAINT-SPRAYING UNITS

[75] Inventor: Paul Günther, Dietersheim, Fed. Rep. of Germany

[73] Assignee: Erich Salzle, Fed. Rep. of Germany

[21] Appl. No.: 330,939

[22] Filed: Dec. 15, 1981

[30] Foreign Application Priority Data

Dec. 17, 1980 [DE] Fed. Rep. of Germany ....... 3047527

[51] Int. Cl.³ .......................... B05B 1/28; B05B 15/04
[52] U.S. Cl. ........................................ 118/326; 55/241; 55/388; 55/DIG. 46; 209/170; 98/115 SB; 427/421
[58] Field of Search ................ 55/241, 388, DIG. 46, 55/159; 209/170; 98/115 SB; 427/345, 421; 118/326

[56] References Cited

U.S. PATENT DOCUMENTS

| | | | |
|---|---|---|---|
| 2,527,139 | 10/1950 | Loney | 55/DIG. 46 |
| 4,130,674 | 12/1978 | Roberts et al. | 427/345 |
| 4,185,970 | 1/1980 | Dean | 427/345 |
| 4,239,515 | 12/1980 | Yanagioka | 55/241 |

FOREIGN PATENT DOCUMENTS

| | | |
|---|---|---|
| 836759 | 9/1952 | Fed. Rep. of Germany . |
| 1017957 | 10/1957 | Fed. Rep. of Germany . |
| 2200807 | 8/1973 | Fed. Rep. of Germany . |
| 2347068 | 4/1975 | Fed. Rep. of Germany . |
| 2433193 | 9/1977 | Fed. Rep. of Germany . |
| 1425207 | 12/1965 | France . |

*Primary Examiner*—Shrive P. Beck
*Attorney, Agent, or Firm*—Karl W. Flocks; Sheridan Neimark

[57] ABSTRACT

The invention relates to a process and an apparatus for extracting droplets of paint from the fine spray or mist in spray booths when sheet metal members or the like are sprayed, without the paint droplets adhering. A calcium chloride solution of 0.01 to 0.5% by weight and having a pH value of 8 to 9.5 serves as washing fluid. To perform this process, the spray booth and the like is followed by a settling or separating vessel in which the coagulated paint droplets floating up with air are separated from the thus regenerated wash solution which can be recycled.

1 Claim, 1 Drawing Figure

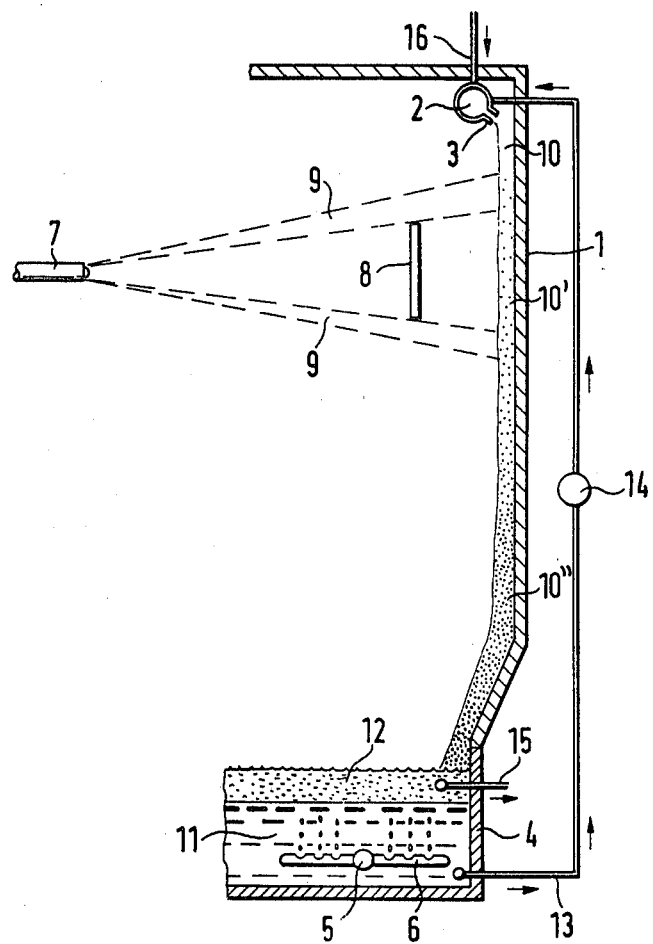

PROCESS AND AN APPARATUS FOR EXTRACTING FINE DROPLETS OF PAINT FROM PAINT-SPRAYING UNITS

BACKGROUND OF INVENTION

Paint-spraying is carried out on a large scale in the automobile industry or in all other industries producing apparatus and equipment, where sheet metal members have to be painted in large quantities, as for domestic appliances, electrical appliances, machine panelling or the like. In this technique, the coating medium is atomized, for instance with the aid of a spray gun, and the spray of very fine droplets is directed onto the article to be painted. Since a high quality finish requires that the article be coated evenly, also in the edge areas, part of the spray of droplets goes past the article to be painted and strikes a wall of the spray booth. The fine spray or mist of paint droplets in the air of the spray booth not only reaches the walls of the spray booth itself, but also gets into the drain pipes and the following units. It is therefore necessary to largely prevent or remove these deposits of paint droplets on the booth walls, in the drain pipe connections and the following units. To this end, the respective walls or the like are generally supplied with water, so that a closed film of water runs down the walls, taking the droplets with it as they strike the wall. The paint-laden fluid collecting in the lower zone of the spray booth then passes into a separating vessel to separate the paint from the aqueous phase and to recycle this aqueous phase to the spray booth.

If water without any additives is used for extracting the paint droplets, then this leads to particles of paint reaching the spray booth walls through the water film and adhering thereto or to the drain pipe connections and the following units; it may also lead to plugging of the nozzles or the like with whose aid the aqueous phase recycled to the spray booth is distributed over the walls.

To solve this problem, one has alrady used salts of sulfonic acids (U.S. Pat. No. 2,208,657), reaction products of starch with formaldehyde (German Pat. No. 836 759), polyvinyl compounds and derivatives of high-polymer carbohydrates (German Auslegeschrift No. 10 17 957), polyamines, polyacrylamides, polyacrylic acids, polymethacrylic acids and polyoxyethylenes (French Pat. No. 15 13 413), oxalic acid (German Offenlegungsschrift No. 22 00 807)or also salts of carboxylic acid (German Offenlegungsschrift No. 23 47 068). In such spray units, droplets of paints capable of being thinned with water were extracted from the fine spray or mist using as aqueous phase solutions of salts having a monovalent, bivalent or trivalent cation. Calcium, barium, manganese, zinc, copper, lead, cadmium and cobalt combined with the anions sulfate, chloride, acetate, tartrate, citrate, phosphate or nitrate were used as bivalent cations. In the prior art process, the salts of bivalent metals had a concentration of 0.4 to 2% by weight in such wash solutions, attention having to be paid that the pH value of this wash solution was not less than 2 and not more than 10. With the aid of this wash solution, the paint droplets coagulated. The coagulate could be separated from the aqueous phase, i.e. from the wash solution. Special control of the pH value is not necessary in this form of prior art.

In the case of all these prior art measures for paints incapable of being thinned with water, the paint coagulate collects at the bottom of the separating vessel. German Auslegeschrift No. 24 33 193 has disclosed that for paints capable of being thinned with water, a concentrated calcium chloride solution of about 40% by weight and having a density of about 1.43 g/cm$^3$ be used as washing fluid. Owing to the high density of the aqueous phase, the paint coagulate floats to the top of the separating vessel and can be skimmed off the aqueous phase. This prior art process has two major drawbacks, namely, the costs of the large amounts of calcium chloride required are considerable and, in addition, a highly concentrated calcium chloride solution is a corrosive fluid which acts on the separating vessel, the relative piping, the booth walls and the like. It is not possible for this prior art process to be used for paints incapable of being thinned with water.

Finally, liquid coagulating agents or flocculating agents are on the market which have to be strongly alkaline, so that such wash solutions have to be expected to have a pH value of at least 11 in order for the paint droplets to be coagulated. These liquid coagulating agents are used both for paints containing metal pigments (metal effect or metallic paints) and for paints containing colour pigments ("Uni" paints). The drawback with these prior art coagulating agents, particularly in the case of metallic paints, is the high pH value which leads to the metal pigments, e.g. aluminum bronze, decomposing or dissolving and generating hydrogen. For this reason the precipitated paint coagulate is frothy and discharge thereof by the conventional discharging means, e.g. scraper bands, cannot be effected or can only be effected in an unsatisfactory manner. Apart from this, the generation of hydrogen represents an explosion hazard which is not to be underestimated, particularly in view of solvent vapour possibly being present. The high pH value of this prior art liquid coagulating agent also leads to the paint itself undergoing change or decomposing, the metal pigment being separated and deposited and the paint base of the coagulate becoming less viscous, this impeding flotation of the coagulate. In this case the paint coagulate floats up due to the wash solution, which contains droplets of paint and runs down the walls of the spray booths of the like, entraining air which attaches to the paint droplets in the form of small bubbles and in this way causes the paint coagulate to float to the top of the thus regenerated wash solution. A further drawback encountered with this prior art process using strongly alkaline liquid coagulating agent is that this wash solution cannot be drained off into the municipal waste water system, but first has to be neutralized to a pH value of at most 9.5 in line with statutory regulations. This requires considerable amounts of acid and the provisions needed for using and handling these amounts of acid represent a handsome cost factor.

SUMMARY OF THE INVENTION

The invention relates to spraying shaped members with paint by atomizing the paint mixed with metal pigments or colour pigments to form a spray of droplets, directing the spray of droplets against the shaped member to be painted, the paint droplets in that part of the spray passing the article to be painted being taken up in a film of liquid running down the spray booth walls, the fluid laden with paint droplets being collected and conducted into a separating or settling vessel where the floating coagulated paint droplets are separated from the fluid and the fluid is recycled, the improvement comprising the use of an aqueous calcium chloride solution having a concentration of 0.01 to 0.5% by weight $CaCl_2$ and a pH value of 8 to 9.5 as fluid, flotation of the coagulated paint droplets with air, separate discharge of the floated paint coagulate and the calcium chloride solution and recycling of the thus regenerated calcium chloride solution to the walls of the spray booth. The invention further relates to an apparatus for performing said process in a spray booth having feeding means for fluid in the upper part so as to allow the fluid to flow down the walls in the form of a homogenous film, means for gathering and collecting the fluid which has flowed down and conducting the same into a settling or separating vessel, and a settling or separating vessel having a discharge pipe for the coagulated paint droplets in the upper area and a pipe for returning the regenerated calcium chloride solution from the lower area of the settling and separating vessel to the upper zone of the walls of the spray booth.

The object of the invention is to provide a process for extracting droplets of paint, in particular of paint incapable of being thinned with water, from fine sprays or mist in paint-spraying units sprinkled with calcium chloride solution as wash solution and for separating the paint coagulate from the wash solution which is recycled to the paint-spraying unit, it being achieved that the paint droplets coagulate rapidly and completely and it being avoided that the paint droplets adhere to the walls of the spray booth, the drainage system or the return piping. The washing fluid containing paint coagulate can settle in a settling or separating vessel, whereupon the paint coagulate collecting on top of the washing fluid is separated from the wash solution and the latter is recycled to the spray unit.

BRIEF DESCRIPTION OF DRAWING

The sole drawing schematically shows a simple apparatus in accordance with the present invention.

DETAILED DESCRIPTION OF EMBODIMENTS

The above object is accomplished by using a washing solution containing 0.01 to 0.5% by weight $CaCl_2$ and having a pH value of 8 to 9.5, said pH value being adjusted with the aid of a strong base. Sodiumm hydroxide solution or potassium hydroxide solution is preferred as base. In the case of metallic paints, the wash solution should preferably have a concentration of 0.05 to 0.1% by weight $CaCl_2$ and a pH value of 8 to 8.5. In the case of colour pigment paints, the wash solution should preferably have a concentration of 0.2 to 0.5% by weight $CaCl_2$ and a pH value of 8.5 to 9.5. To prepare the wash solution employed according to the invention, any $CaCl_2$ material is used. Owing to it being readily available, an 80 wt. % $CaCl_2$ of industrial quality is preferred, whose $CaCl_2$ content has, however, to be considered in adjusting the concentration on the washing fluid.

It is important that the above-stated ranges of concentration of calcium chloride be observed in the wash solution. The coagulation may not be satisfactory below the aforesaid lower limits of concentration, while above the aforesaid upper limits nothing will be gained in the way the process according to the invention functions, but the costs for material (calcium chloride) and the danger of corrosion increase.

It is also important that the said pH value range be observed. Above a pH of 9.5, it can happen that calcium hydroxide precipitates, while below a pH of 8, the coagulation may not be sufficient in some systems. With the said pH values, the calcium chloride may partially hydrolyze in the wash solution laden with paint droplets, possibly with the formation of calcium oxychloride or calcium hydroxide which could be effective as nuclei for the coagulation of the paint droplets.

As already mentioned above, the washing fluid running down the walls not only takes along the paint droplets from the fine spray or mist, but also air which forms small bubbles on the paint particles or droplets within the aqueous phase of the wash solution and causes them to float. This flotation can be promoted by blowing air into the settling vessel.

The process according to the invention is suitable for the extraction of all sorts of paints, as are used in industry, e.g. alkyd resins, acrylate resins, epoxy resins, melamine resins, polyester resins and the like. These paints may be ones which are capable of being thinned with water—as are stoving lacquers, such as polycarboxylic acid in neutralized form—or incapable of being thinned with water. However, the process according to the invention affords especial advantages with paints which are incapable of being thinned with water.

The coagulation of the paint droplets is generally effected with the agency of an electrolyte. In this case, the calcium chloride of the wash solution also has the coagulating effect of an electrolyte on the resin droplets. The coagulate separates rapidly and completely from the liquid phase and therefore can readily be separated from the same.

Bactericides, corrosion inhibitors and similar additives may be added to the wash solution, particularly for the extraction of colour pigment paints, so as thus to extend the time over which the calcium chloride solution can be used.

With reference to the drawing which schematically depicts a simple embodiment of the present apparatus, there is shown a spray booth having a rear wall 1 with a gathering or collecting vessel 4 at the bottom thereof. A distributing pipe 2 is provided near the upper part of the rear wall 1 of the spray booth, the distributing pipe 2 having apertures 3 facing the rear wall 1 in order to distribute liquid from the pipe 2 so that it will run down the rear wall 1 as shown. A distributing duct 5 including spraygun arms 6 is arranged adjacent the bottom of the collection vessel 4. A recycling line 13 having a pump 14 along its length branches off from the bottom of the collection vessel 4 and leads to the distributing pipe 2. Such distributing pipe 2 is also provided with a fresh water duct 16. A collection vessel discharge means is provided at a suitable height of the collection vessel 4.

In operation, an article 8 to be painted is coated with paint by the use of a spraygun 7. As is usual, the spray cone of the gun 70 exceeds the size of the article 8 to be painted to some extent so as to insure that the peripheral edges of the article 8 receive a sufficient quantity of paint. The consequence of such overspraying is that within a zone 9 around the article 8, unused sprayed paint would reach the rear wall of the spray booth. In order to prevent paint particles from sticking on the rear wall 1 of the spray booth, a fluid film 10 is uniformly distributed by the apertures 3 of the distributing pipe 2 so as to flow down the entire rear wall 1 of the spray booth so as to take up to an increasing extent the paint droplets 10' and 10".

In the fluid film, provided the flow period is long enough, there is achieved a complete coagulation of the paint droplets into readily separable aggregates. The wash fluid flowing down the rear wall 1 of the spray booth is in the instant invention a calcium chloride solution, as pointed out above. The calcium chloride causes the paint droplets to coagulate. The wash fluid laden with paint droplets and with coagulated paint droplets in particular, collects in the vessel 4 and separates into a lower aqueous phase 11 containing calcium chloride and optionally small quantities of non-coagulated paint droplets, and into a upper organiz phase 12. The separation of the aqueous phase from the organic phase, and in particular the forming into a "cream" of the coagulated paint droplets in the organic phase, are assisted and accelerated by air introduced through the distributing duct 5 and nozzle arms 6. The aqueous phase can be removed from the vessel 4 continually or intermittently via the recycling line 13, and thereby recycled to the distributing pipe 2 with the aid of the pump 14.

The organic phase substantially consisting of coagulated paint droplets is removed through the discharger means 15 and is optionally processed for reuse in paint spraying. If necessary, fresh calcium chloride solution can be fed to the distributing pipe 2 via supply line 16, and hence into the process cycle.

The process according to the invention is illustrated further with the aid of the following Examples:

EXAMPLE 1

In a settling vessel of a paint-spraying unit for metal-effect paints on the basis of polyacrylate, 200 kg calcium chloride were dissolved in 200 m$^3$ water to give a solution of 0.1% by weight. As the calcium chloride was of industrial quality, the concentration of the wash solution was actually 0.080% CaCl$_2$. This calcium chloride solution was adjusted to a pH value of 8 under agitation by means of a sodium hydroxide solution of about 50% by weight.

This wash solution was then pumped to the upper edge of the spray booth walls which were to be water-covered, from where the wash solution flowed down as a continuous film. This water film took up the fine droplets of paint passing the article to be painted and transported the paint droplets into the settling vessel where the droplets coagulated and floated up. The paint coagulate was skimmed off and is deposited or burned. The regenerated wash solution freed of paint was recycled to the spray booth. By adding the respective amounts of calcium chloride and/or base at the proper time, the concentration of calcium chloride and the pH value were maintained at the above-stated values.

After having been in use for four months, the wash solution was completely clear and could be drained into the municipal waste water system without any further steps being taken. No appreciable deposition of coagulate or generation of gas was observed. There was hence no frothing in the case of metallic paints. No difficulties were presented in discharging the paint coagulate.

COMPARITIVE EXAMPLE A

Example 1 was modified in that instead of calcium chloride solution having the above pH value, a commercial liquid coagulating agent comprising a strong inorganic base as chief constituent ("Isogel 223" of Messrs. Kluthe, Heidelberg and "VR 7803-1" of Messrs. Henkel, Düsseldorf) was fed into the settling vessel, in accordance with the suppliers' instructions, until the pH value was above 11.

After having been in use for one month, the wash solution under comparison was distinctly cloudy. Before the wash solution could be discharged into the municipal waste water system, it was necessary for sludge to be removed and for the solution to be neutralized.

COMPARITIVE EXAMPLE B

Comparitive Example A was modified in that the amount of coagulating agent introduced into the settling vessel was only sufficient for the wash solution to have a pH value of 8.5 to 9.5. With this wash solution, neither did the paint particles coagulate nor could the paint droplets be prevented from adhering to sliders, piping, nozzles for recycling liquid to the walls of the spray booth or the like.

EXAMPLE 2

Example 1 was modified in that a polyacrylate filled with colour pigment was used. The wash solution had a concentration of 0.2% by weight CaCl$_2$ and a pH value of 8.5.

EXAMPLE 3

A metal-effect paint on the basis of an alkyd resin was used in the unit of Example 1. A calcium chloride solution of 0.1% by weight and having a pH value of 8.5 was used as wash solution.

EXAMPLE 4

Example 3 was modified in that an alkyd resin paint filled with a colour pigment was used. A calcium chloride solution of 0.5% by weight and having a pH value of 9.5 was used as wash solution.

EXAMPLE 5

In this Example, a metal-effect paint on the basis of an epoxy resin was used. The wash solution was a calcium chloride solution of 0.09% by weight and having a pH value of 8.3.

EXAMPLE 6

Example 5 was modified in that the epoxy metal contained a colour pigment instead of the metal pigment and the wash solution had a concentration of 0.4% by weight CaCl$_2$ and a pH value of 9.3.

EXAMPLE 7

A polyester metal-effect paint was used in accordance with Example 1. A calcium chloride solution of 0.05% by weight and having a pH value of 8 served as wash solution.

EXAMPLE 8

Example 7 was modified in that a wash solution comprising a 0.3% by weight calcium chloride solution—pH value 9— was used for a polyester resin paint filled with a colour pigment.

EXAMPLE 9

A paint capable of being thinned with water and filled with colour pigment, said paint being on the basis of a neutralized polycarboxylic acid was used in the spray unit of Example 1. In this case, a calcium chloride solution of 0.48% by weight and having a pH value of 8.1 served as wash solution.

It proved that with the wash solutions according to the invention, good coagulation of the paint droplets and flotation of the coagulate was achieved for all the various paints as were employed in Examples 1 to 9. To promote flotation of the coagulate, air could be blown in through nozzles in the separating and settling vessel. In principle, however, the air entrained by the washing fluid is sufficient for flotation of the coagulate.

What we claim is:

1. An apparatus for spraying shaped members with paint by atomizing the paint mixed with metal pigments or color pigments to form a spray of droplets, directing the spray of droplets against the shaped member to be painted, from a spray booth having feeding means for aqueous calcium chloride solution in the upper part so as to allow the solution to flow down the walls in the form of a homogenous film, means for gathering and collecting the solution which has flowed down and taken up coagulated paint droplets and conducting the same into a settling or separating vessel, and a settling or separating vessel having a discharge pipe for the coagulated paint droplets in the upper area and a pipe for returning the regenerated calcium chloride solution from the lower area of the settling and separating vessel to the upper zone of the walls of the spray booth, said settling vessel being provided with nozzles for injecting air to promote the flotation of the coagulated paint droplets.

* * * * *